United States Patent
Andrews et al.

(10) Patent No.: US 6,655,587 B2
(45) Date of Patent: Dec. 2, 2003

(54) CUSTOMER ADMINISTERED AUTOLOAD

(75) Inventors: David W. Andrews, Leesburg, VA (US); Leigh L. Callaway, Springfield, VA (US); Robert Hughes, Haymarket, VA (US); Douglas Young, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 10/104,635

(22) Filed: Mar. 21, 2002

(65) Prior Publication Data

US 2003/0085272 A1 May 8, 2003

Related U.S. Application Data

(60) Provisional application No. 60/277,816, filed on Mar. 21, 2001.

(51) Int. Cl.⁷ .............................. G06K 5/00; G06K 7/08
(52) U.S. Cl. ........................................ 235/383; 235/381
(58) Field of Search .................................. 235/380, 379, 235/375, 383, 385, 382, 492, 493, 449, 381; 713/172, 200; 710/2

(56) References Cited

U.S. PATENT DOCUMENTS

| | | | |
|---|---|---|---|
| 4,074,352 A | * | 2/1978 | Cook et al. ..................... 710/2 |
| 5,650,761 A | | 7/1997 | Gomm et al. |
| 5,704,046 A | | 12/1997 | Hogan |
| 5,734,722 A | | 3/1998 | Halpern |
| 5,748,737 A | | 5/1998 | Daggar |
| 5,832,090 A | | 11/1998 | Raspotnik |
| 5,856,659 A | * | 1/1999 | Drupsteen et al. .......... 235/380 |
| 5,859,419 A | | 1/1999 | Wynn |
| 5,892,211 A | | 4/1999 | Davis et al. |
| 5,936,221 A | * | 8/1999 | Corder et al. ................ 235/380 |
| 6,014,748 A | * | 1/2000 | Tushie et al. ................ 713/200 |
| 6,018,717 A | | 1/2000 | Lee et al. |
| 6,029,892 A | | 2/2000 | Miyake |
| 6,062,472 A | * | 5/2000 | Cheung ........................ 235/380 |
| 6,085,976 A | | 7/2000 | Sehr |
| 6,196,459 B1 | * | 3/2001 | Goman et al. ............... 235/380 |
| 6,202,155 B1 | * | 3/2001 | Tushie et al. ................ 713/200 |
| 6,317,832 B1 | * | 11/2001 | Everett et al. ............... 713/172 |
| 6,367,011 B1 | * | 4/2002 | Lee et al. .................... 713/172 |
| 6,508,400 B1 | * | 1/2003 | Ishifuji et al. ............... 235/382 |
| 2002/0117542 A1 | * | 8/2002 | Hamann et al. ............. 235/380 |

FOREIGN PATENT DOCUMENTS

WO     WO 99/19843     4/1999

OTHER PUBLICATIONS

Print out of web page "SmarTrip, More than a smart card. It's pure genius" at http://wmata.com.USINGMET/smart-rip.htm, downloaded on Sep. 11, 2000.

* cited by examiner

Primary Examiner—Thien M. Le
(74) Attorney, Agent, or Firm—Brown Martin Haller & McClain LLP

(57) ABSTRACT

A system and method for automatically loading a pre-selected value onto a smart card allows a patron to enter or leave a transit system gate without having to add a fare value at a vending machine. The automatic loading provides added convenience and security for the patron. The vehicle for the automatically-loaded value is either a credit card that is pre-authorized for use by the patron, or the patron's available benefits. The automatic loading process may be utilized to autoload values of benefits only, or to load values from a combination of benefits and credit card transactions. The pre-selected autoload value is loaded onto the smart card at the gate before confirmation that the credit card transaction is authorized. The gate sends a message to a transit central computer that an autoload has occurred. The central computer determines whether benefits are available to fill the request, and forwards a request for the difference to a credit processing company.

18 Claims, 3 Drawing Sheets

CUSTOMER ADMINISTERED AUTOLOAD

RELATED APPLICATIONS

This application claims priority under 35 U.S.C. 119(e) to provisional U.S. Patent Application No. 60/277,816 filed Mar. 21, 2001.

BACKGROUND OF THE INVENTION

1. Field of Invention

This invention relates generally to smart card use in transit systems, and more specifically to a system for allowing patrons to have values automatically loaded onto their smart cards.

2. Background

The use of fare cards in mass transit systems has reached record levels with the introduction of free transfers, unlimited passes, and fare pricing systems based on distance traveled, time of day, and user categorization including age and frequent user. Automatic fare collection (AFC) presents several advantages over person-to-person cash exchanges including reduced operating costs based upon a decrease in required personnel, automation of system accounting, and improved convenience and safety for commuters by the elimination of ticket window lines and ticket purchases for each transit system ride.

Fare cards are available in various formats including magnetic stripe cards, contact smart cards and contactless smart cards. The fare cards may be purchased at automatic vending machines utilizing bills/coins, credit, and/or debit cards. The value of the card may be limited to the value of a single transit fare, or may exceed the value of a single transit fare so that the card may be used for multiple fares. A fare card having a value exceeding one transit fare offers an advantage of a single financial transaction for multiple rides. In addition, since the fare collection systems deduct value automatically for time and/or distance based fares, the rider does not need to compute exact fare amount as long as the amount on the card equals or exceeds the required fare, and thus, the time the rider spends at a fare card dispensing machine is shortened. Any monetary value remaining on the card is usable for a subsequent fare. Fare cards also offer the advantage of being reusable. The transit rider inserts a used card into an automatic fare vending machines along with a payment means including bills/coins, or credit/debit cards, and a corresponding added value is stored on the fare card.

Current automatic vending machines offer the above stated advantages of reuse of a smart card and quick transaction times. However, due to frequent use of the smart card, a transit patron is unlikely to know the exact amount on his or her card at any given time. In order to determine the value before attempting to pass through a transit gate, the patron must have access to a vending machine or another card reader. If the patron attempts to enter the gate without sufficient value in the smart card, he or she will be denied access to the transit system until value is added to the smart card. Thus, the patron will have to seek out a vending machine to add value to the smart card. During peak commuter hours, commuters are often faced with lines at the automatic fare vending machines.

The procedure of loading monetary value onto a smart card requires the patron to insert or wave the smart card past the vending machine to read the current value of the card. The patron then selects an action prompted by the vending machine to add monetary value to the card by either inserting cash into the vending machine conducting the transaction utilizing a credit card. The credit card transaction requires that the patron's credit card be inserted into the vending machine. The vending machine then initiates a check through the credit card company to obtain approval to charge the requested amount. Once a monetary value is deposited into the vending machine or approved via credit, the patron must re-insert or wave the smart card by a target to have the requested value added to the smart card. The patron is then ready to utilize the smart card to gain access to the transit system. The extra time required to add value to the smart card, as well as the need to have cash or a credit card on hand at all time, is inconvenient for the patron and may cause undue delays for the patron in arriving at his or her destination.

Smart cards may also be utilized to support employee benefits programs that supply a set monetary value to be used by the employee each month for payment of transit fare. To receive the benefit, a patron must have the monetary value loaded onto the card at a transit vending machine. Thus, there is a potential for long patron queues waiting at transit vending machines at the beginning of each month. As the benefits program expands, and is made available to an increasing number of patrons, the vendor queues will become frustratingly longer.

Therefore, a need remains in mass transit systems to deploy a system feature that allows transit system patrons participating in transit programs to automatically load a monetary value onto their smart cards at the rail transit gates and/or bus fare boxes.

SUMMARY OF THE INVENTION

It is an advantage of the present invention to provide a system for automatically loading a monetary value onto a smart card.

It is another advantage to provide a the system which allow patrons to set up their smart cards for an autoload status and then simply allow them to use their smart cards without periodic reloads at the vending devices.

Another advantage of the present invention is to provide a system that is "Self Service" oriented for reloading monetary values on smart cards at transit gates, bus fare boxes, and other similar transit authority equipment, in order to reduce program administrative costs, including the costs associated with transit authority personnel and equipment.

Yet another advantage is to provide convenient payment vehicles, including credit cards and already-established employee benefits programs, at initial introduction of the system.

Still another advantage is to provide a system that automatically loads benefits to a patron's smart card without requiring changes to the transit authority central computer and processing.

A further advantage is to provide a system that improves the transit patron's security by eliminating the need for monetary transactions at a vending machine.

In the exemplary embodiment of the present invention, a transit system allows patrons to set-up their smart cards for an autoload function, also referred to herein as a "customer administered autoload" system. The system for autoloading a smart card may be used to support all transit systems including rail systems and bus systems. The autoload feature of a transit system allows the transit patron to quickly refresh the value of his or her smart card by automatically billing the patron's credit card account, or by automatically applying the patron's employee benefits. Automatic loading of the monetary value may be exercised manually by the patron at a vendor, or automatically at gates or fare boxes which are set up to accept smart card transactions. As disclosed herein, gates are access control devices used in the rail system and fare boxes are access control devices used on buses. Automatic reloading at the gates or fare boxes allows transit patrons to use smart cards without having to periodically reload values onto their smart cards at the transit vending machines.

In the exemplary embodiment, the patron utilizes a vending machine or another transit facility for setting up the automatic load, i.e. "autoload" feature. During the set-up process, the patron supplies credit card or other debit-type card information and a pre-approved monetary refresh value. The credit card information is then stored on the patron's smart card. If a monetary value on the smart card does not cover a required fare, transit gates autoload the pre-approved monetary value to the smart card utilizing the credit/debit card information. In the exemplary embodiment, the patron may utilize more than one credit or debit vehicle. For example, if a patron is supplied with transit fare allowances through his or her employer, the patron may have a benefit of a line of credit for a set time period. The Customer administered autoload system may be set up to exhaust the benefit line of credit before utilizing the patron's credit card information to initiate an add value procedure.

Implementation Approach. In an exemplary embodiment of the present invention, the initial implementation of the customer administered autoload system provides transit patrons with instructions on how to setup the customer administered autoload at a transit vending machine. The customer administered autoload program of the exemplary embodiment is separate from other transit system programs because it requires a specific smart card technology. Thus, the patron must be supplied with an autoload-capable smart card which has a valid serial number that is recognized by the customer administered autoload system, only. In other embodiments, the customer administered autoload program is utilized by patrons that participate in other transit benefits programs, such that the autoload feature will only use the credit card as the payment vehicle when the benefits program allotment has been exhausted.

Set Up. In the exemplary embodiment of the present invention, setup for participation in customer administered autoload is offered to any patron at a transit vending machine. Conditions for participation in the autoload program may be required. For example, the smart card and/or patron must be registered with the transit authority, the smart card has been used in a credit transaction that has been approved, the current transaction meets a minimal price for either the product or value loaded, and/or the card expiration date is at least six months out. Certain conditions may prohibit the patron from either setting up the autoload function on his or her smart card or completing an autoload transaction. For example, the autoload smart card is either not set up for autoload, the credit card used in the current transaction is not the same one used to initially setup autoload, e.g., the primary account number, and expiration date, and/or the card is setup for autoload for a specific value or product, and the customer has asked for a different value or product.

In an exemplary method for setting up autoload on a smart card, a transit vending machine appends the registered smart card number to a credit card authorization request message (EUC6). The central computer sends a reply message (EUC2) to verify that the smart card is registered and has address data specified. The vendor applies the above criteria, and offers autoload to the patron as an option if the criterion is met. If the patron accepts the autoload option, one or two explanatory panels of data are presented on the vendor display explaining autoload and referencing the patron educational material. If the patron then verifies and accepts the option of autoload, the card is initialized for autoload.

The vendor initializes the smart card for autoload by setting an autoload bit on the smart card to "on". In addition, the credit card Primary Account Number (PAN) and expiration date is recorded on the smart card as well as a specified product or value. The vendor sends a special fare card detail transaction data message (EU65) to the central computer which then documents the autoload setup. Since the patron is offered setup on the various conditions as discussed above, e.g., the credit card used in the current transaction is not the same one used to initially setup autoload, the process of changing to a different credit card is supported via the setup processing.

In the exemplary embodiment of the present invention, the smart card also may be initialized for autoload at a Point of Issue (POI) device. This allows the customer service of the transit authority to issue a smart card to the patron that is setup for autoload. This is of primary importance to bus only riders that may not have access to vending machines. A credit card autoload may also be accomplished at a transit vending machine. The autoload at a vending machine provides a quick transaction since the credit card is not required, and the overall time to complete the transaction is reduced.

Withdrawal from the Program. There are several options for withdrawal from the autoload program. A first option is for the patron to discontinue use of the smart card such that no further autoloads will be performed. The customer may also visit a transit authority vendor where he or she may request withdrawal from the autoload program. If withdrawal is requested, the vendor sets the autoload bit to "off" via a menu specification. The withdrawal request then is reported via an EUxx message element type (MET) to the central computer. The customer may also return the smart card to the Transit Authority where it can be reinitialized.

The Autoload Process. Once a smart card is initialized for autoload, the patron may use it as a "normal" smart card. When the autoload-initialized smart card is presented at a gate or fare box, the patron-selected value or product will automatically be added to the card, providing the smart card meets the autoload criteria. The load will be documented as an autoload MET in an EU65 and maintained as part of the smart card transaction history. In the exemplary embodiment of the inventive method, the criteria for autoloading includes verifying that the autoload bit is set to "on", verifying that the value of a value-based card has dropped below a specified level, and/or verifying that the expiration of a pass is within a set number of days or rides. In the exemplary embodiment, the autoload criteria is downloaded to the gates and fare boxes. Alternatively, the values used in the above criteria may be hardcoded at the processing device, i.e., the gates and bus fare boxes.

In addition to the normal EU65 transaction, the gate/bus fare box sends a force post message (EUC4) to the central computer to indicate that an autoload transaction occurred. The central computer recognizes the force post message (EUC4) as an autoload transaction and performs special processing. First, the central computer verifies whether the card holder participates in a benefits program. If the benefits program qualifies for the requested transaction, the value of the benefits program is utilized to satisfy part or all of the requested transaction. If the value of the benefits program is sufficient to satisfy all of the request, no further action is taken. Otherwise, the central computer transforms the force post into a credit authorization request. An approved credit authorization request prompts the central computer to create a confirmation entry in an autoload or a credit transaction database. A declined credit authorization request prompts the central computer to add the smart card number to a negative list.

Negative list. The negative list is utilized in a negative list process to initiate a "last load recall" rather than rejecting the card. This feature provides a less harsh response to an expired/bad credit card that is specified as the autoload vehicle. The negative list process includes setting the autoload enable bit to "off" and recalling the last product or value load performed.

Messages. The transit gate or fare box of the exemplary embodiment displays a variety of messages to the patron. For example, if a payment vehicle, e.g., the credit card, is within forty-five (45) days of expiration, each use of the autoload-initiated card will cause a warning message to be displayed to the patron at the transit gate or fare box. If the payment vehicle has expired, autoload will not be performed, and the patron will be refused entry when the value, the number of rides or the time for the pass is exhausted. If an autoload transaction is processed, the gate or fare box flashes a message indicating that the smart card has been autoloaded with a specified amount.

ACRONYMS UTILIZED IN THE DESCRIPTION

The following detailed description utilizes a number of acronyms. While definitions are typically provided with the first instance of each acronym, for convenience, a list of the acronyms and abbreviations used herein along with their respective definitions are shown below.

| ACRONYM | DEFINITION |
|---|---|
| ACI | ACI Worldwide, Inc. |
| AFC | Automatic Fare Collection (system) |
| EUB5 | A Benefits Claim Request |
| EUC4 | Debit/Credit Financial Transaction Advice Message (Force Post) |
| EUBX | Message set for Benefits requests. |
| EUCx | Message set for Debit/Credit processing. |
| EUxx | Unsolicited audit data (produced on schedule) message. These types of messages are event driven. The sender expects only an acknowledgment. |
| EU65 | Farecard Detail Transaction Data Message |
| ISO | International Standards Organization |
| Message | Any data sequence initiated by the CC or SMADS, commencing with the sequence ECxx, EIxx, ERxx, ETxx, or EUxx, as defined in this document. |
| MET | Message Element Type |
| PAN | Primary Account Number (Credit/Debit card number) |
| PIN | Personal Identification Number |
| POI | Point Of Issue equipment. A PC-based system that initializes and changes data on a smart card. |
| SMART CARD | A microprocessor-based transceiver that can communicate with a host computer. Used for a proximity electronic fare collection system for rapid transit or toll road applications. |
| SMADS | Station Monitor And Display System. This is a PC-based system that is physically in the system mezzanines and acts as the collection point for all device transactions (e.g., gates, vendors, PLE, and exit fare) to the CC. |

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF A PREFERRED EMBODIMENT

Figure 1:
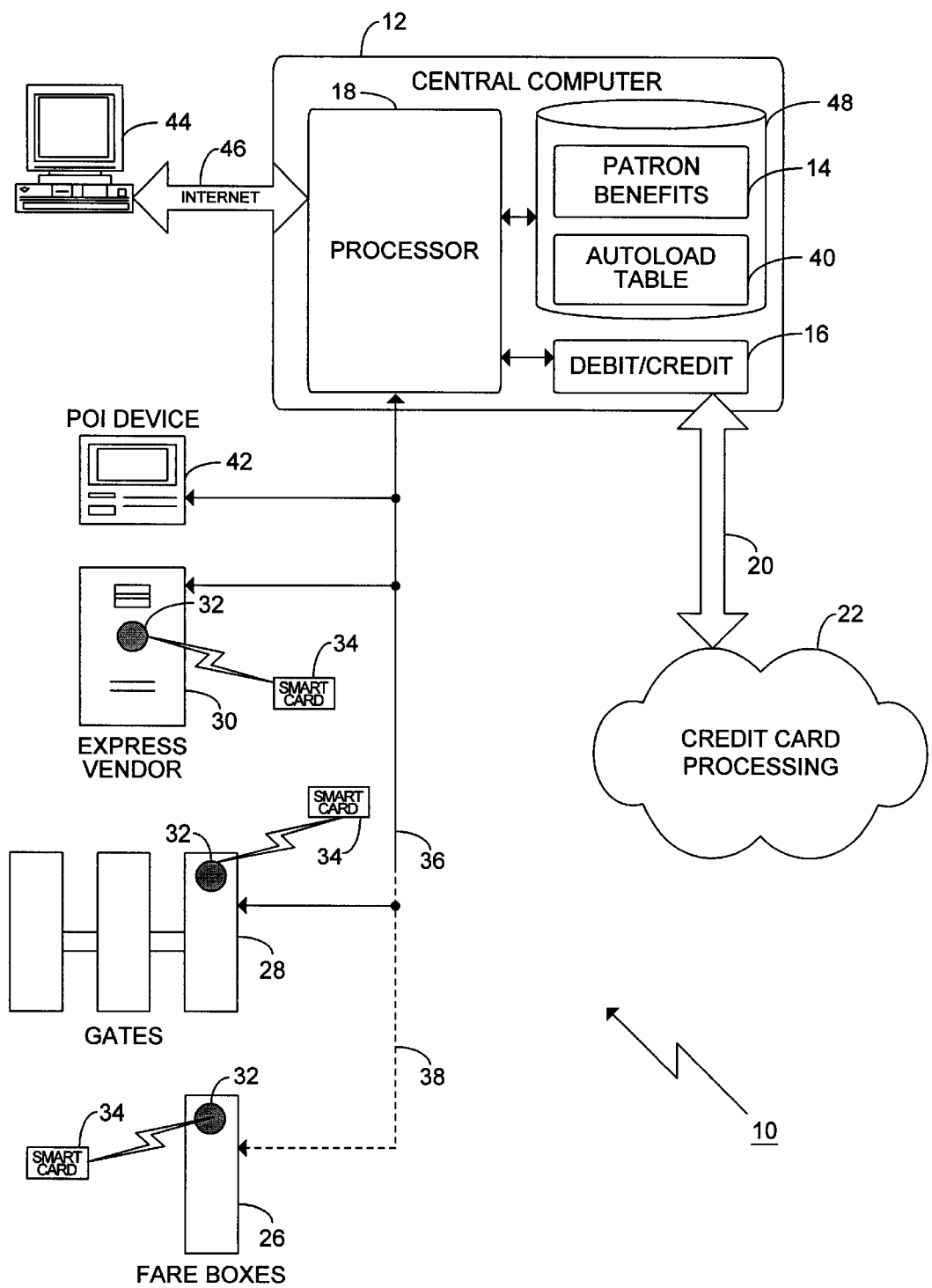
FIG. 1 is an illustration of a system for implementing Customer Administered Autoload.

FIG. 1 illustrates the customer administered autoload system 10 of a preferred embodiment of the present invention. The customer administered autoload system 10 allows a transit patron to quickly refresh a value on a transit smart card 34, e.g., a smart card utilized for a proximity electronic fare collection system for rapid transit or toll road applications, by automatically billing the patron's credit card account, or by automatically applying benefits provided to the patron by a third party, e.g., an employer. The autoload feature is an option that can be exercised manually by the patron at a transit vending machine 30 (vendor) or automatically at gates 28 or bus fare boxes 26. A transit vending machine 30 is a device operated by patrons that dispenses fare media in exchange for value, e.g., cash, smart card trade-in, benefits, debit card, or credit card. In a preferred embodiment of the present invention, the autoload processes, as shown in FIGS. 2 through 5, are implemented with minimum administrative support by the transit authority staff. The customer administered autoload is convenient for a transit patron to use and allows the transit patron to change the payment method, or vehicle, at his or her convenience.

Continuing with FIG. 1, values autoloaded onto the smart cards 34 may be obtained by means of a benefits autoload process or a credit card autoload process. The benefits autoload process is a pre-paid process as any available benefits are stored in a patron benefits data base 14 in the transit central computer 12. The credit card autoload process is a post-pay process which occurs through a debit/credit transaction 20.

Patron Benefits Autoload. The benefits autoload feature charges all smart card value adds to the patron's benefits account 14 stored in the transit authority central computer 12. The setup for the benefits autoload is fully automatic. The patron only has to register with his employer or other benefits provider, and his associated data is loaded in the Patron Benefits table 14 through the transit authority or other authorized personnel. In a preferred embodiment of the invention, a patron may request the benefit provider to initiate an autoload at rail gates 28 and/or bus fare boxes 26. A patron who requests the bus autoload option automatically receives the benefits at the transit devices 28, 26 or at a transit vending machine 30.

Benefits available to a patron are stored in the central computer 12 in a benefits data base 14 which associates a patron to a specific smart card serial number. The smart card automatically receives the benefit value when the benefit becomes available and the card is presented at a rail gate 28 or a bus fare box 26. A Benefits Application executed by the processor 18 of the central computer 12 prepares a table of the available benefits for benefits autoload processing. The autoload table includes the serial numbers of eligible smart cards 34, the sum total of the available benefits for each eligible smart card, and an assigned control number to identify the benefit. The autoload table of the eligible smart card 34 is sent to the rail gates 28 over a transit system communication network 36. At least a portion of the autoload table 40 is downloaded 38 via, e.g., a portable device or bus depot computer (not shown), to each bus fare box 26.

Figure 4:
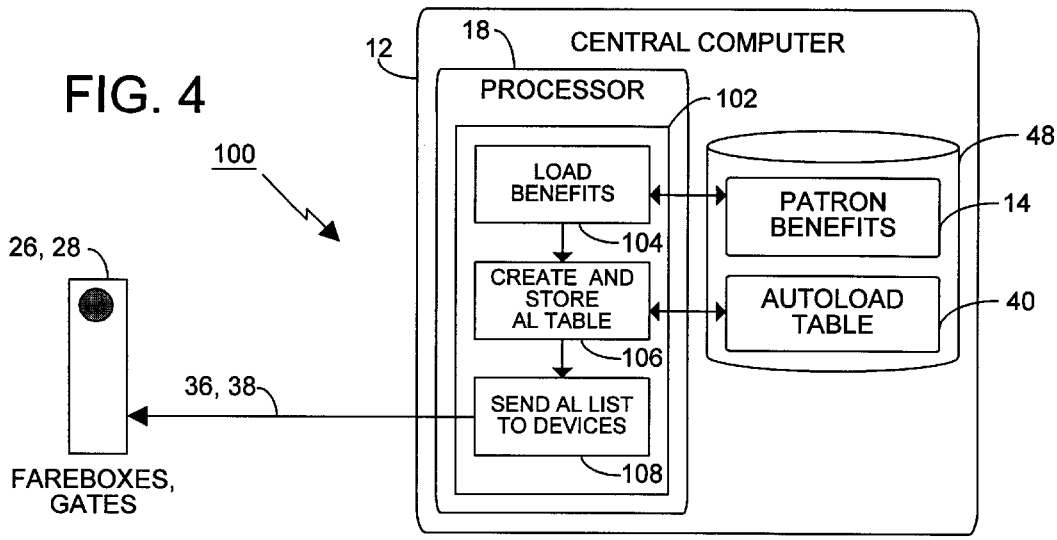
FIG. 4 illustrates the autoload table and list generation.

FIG. 4 illustrates the central computer autoload processes 100 for creating an autoload list 102, which is performed at the transit authority central computer 12. The benefits autoload table 40 is created at regular intervals, for example, each day at 1:00 am, in order to update patrons access to available benefits. In a first step 104, the processor 18 of the central computer 12 loads benefits from the patron benefits database 14 which associates eligible smart cards with a particular benefit value. A current autoload (AL) table is generated and stored 106 in the autoload table data base 40. The table may includes several columns, as shown in Table 1, associated with each smart card. Autoload tables of other embodiments may contain any combination of patron information data.

TABLE 1

Auto Load Columns

| smart card serial number | control number | benefit amount | purse code | status | status Greenwich Mean Time (GMT) | create GMT | Effective GMT | Last AL list load GMT |
|---|---|---|---|---|---|---|---|---|

The smart card serial number is pre-registered for a specific patron. A control number assigned to each benefit resides on the autoload table 40 and is also recorded in the patron benefits data base 14. The control number is one byte (0 to 255) that recycles. For a patron that has only monthly benefits with one purse, the control number will recycle approximately every twenty-one (21) years without duplication. The control number eliminates the possible problem of a patron "double dipping" into available benefits as further explained below. The purse code identifies a specific use for the purse as the card may have multiple purses, e.g., parking only, bus only. The purse code offers flexibility for purse values on the smart card 34. The status identifies the current status for the smart card 34, e.g., whether the card is pending, delivered, etc. The Greenwich Mean Time (GMT) is the actual time of creation of the status, the table, and the most recent autoload list download. The effective date indicates when a benefit is available for situations in which, for example, benefits are pre-authorized and downloaded ahead of time. The effective date prevents the benefit from delivery before that date.

In step 108, an autoload list, which is a subset of the autoload table, is downloaded to the gates and fare boxes 26, 28. An "AS OF DATE" is set as a unique identifier for the autoload list. Each autoload list entry requires ten (10) bytes, and contains the following data fields:

| Data Field | Bytes |
|---|---|
| Serial number | 6 |
| Amount | 2 |

| Data Field | Bytes |
|---|---|
| Control number | 1 |
| Purse code | 1 |

Thus, one megabyte of memory is required at each device for each 100,000 entries on the autoload list. In the preferred embodiment of the invention, patrons may have multiple autoload entries if they are eligible for more than one benefit.

The control number is a one (1) byte binary field with a numeric range of 0 thru 255. The autoload process of the preferred embodiment does not use zero (0) for a range of 1 thru 255. A control number is assigned to a benefit when it is loaded into the benefits table 14. The central computer 12 assigns the next control number in sequential order. The assigning of numbers is cyclic, i.e., the next number after 255 is 1. When multiple benefits are created for a patron, a single unique control number is assigned to each benefit created. A single autoload table entry is created for that single control number. The value or amount related to the control number is the total amount of the benefits containing that control number. Only active benefits are used to create entries on the autoload table.

The expiration dates of the benefits determine the order in which they are used to satisfy requests for benefits. For example, a benefit whose expiration date is Mar. 21, 2002 will be used before a benefit with an expiration date of Mar. 30, 2002. In the preferred embodiment, the number of entries in the autoload table may be limited depending upon what is available on a smart card. For example, a patron may be limited to access to only four benefits at one time. When there are more than four control numbers, the four control numbers that have the earliest expiration dates are loaded on the autoload table. Expired benefits are replaced on the autoload table with newer benefits.

TABLE 2

Control Number Examples

| Ctl# | Benefit | Expiration | Priority |
|---|---|---|---|
| 201 | A | 6 Jan | 1 |
|  | B | 10 Jan | 3 |
|  | C | 11 Jan | 4 |
| 202 | A | 8 Jan | 2 |
| 203 | A | 30 Jan | 9 |
| 204 | A | 15 Jan | 6 |
|  | B | 17 Jan | 7 |
|  | C | 29 Jan | 8 |
| 205 | A | 12 Jan | 5 |

Table 2 illustrates a patron's available benefits. Control numbers 201 and 204 have three benefits each and control numbers 202, 203, and 205 have one benefit each. Only the four control numbers with the earliest expiration dates are selected for the autoload list downloaded to the gates 28 and fare boxes 26. Thus, benefits 203A, 201A, 201B, and 202A are selected for the autoload list. If benefit 202A is claimed totally in an autoload transaction, then it is not a candidate for the next created autoload table. A subsequent autoload list will contain control numbers 201, 203, 204, and 205.

Figure 2:
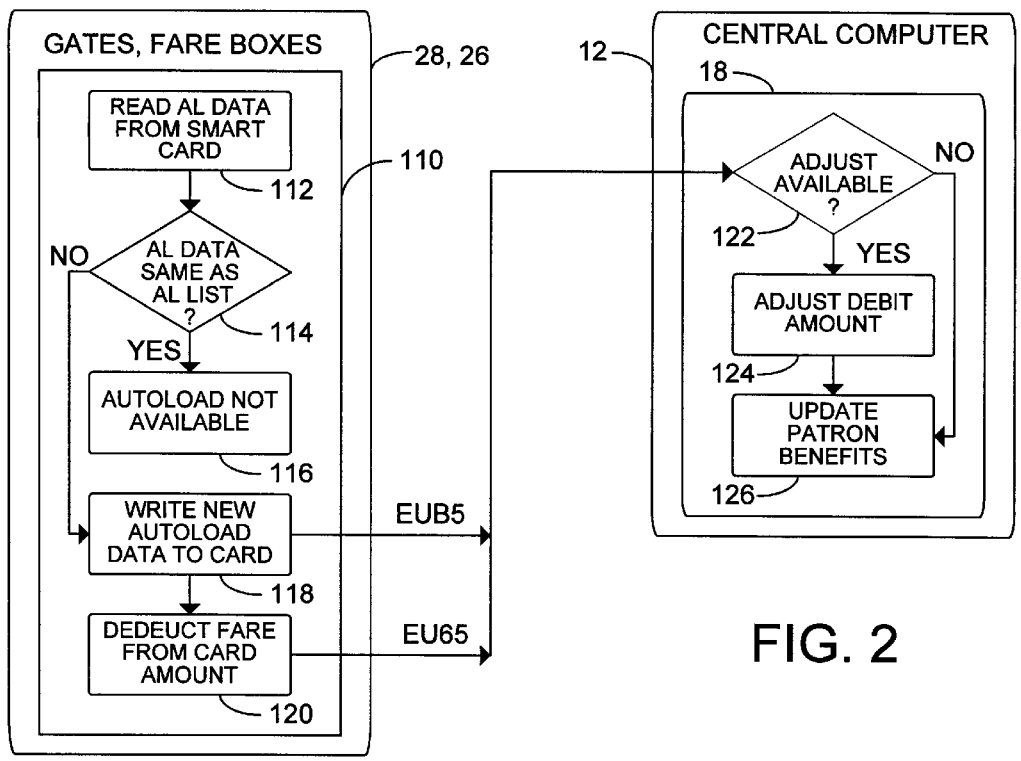
FIG. 2 is an illustration of the benefits autoload process.

The Benefits Autoload Process. The benefits autoload process 110 is illustrated in FIG. 2. When a patron uses his or her smart card at a gate or fare box 26, 28, a control number and amount is read from the smart card 34, step 112. The control number and amount read from the smart card 34 is compared to the control number and amount from the autoload list downloaded from the central computer, step 114. If the control number and amounts on the card match those in the autoload list in the device 26, 28, then the card is not eligible for an autoload, step 116. If the control number and amount do not match, then the device adds the autoload list amounts to the value remaining, i.e., the general purse, on the smart card, and updates the control number and amount on the smart card 118. The amounts loaded and their control numbers are sent to the central computer via an EUB5 message which requests a claim for the amount loaded. The device 26, 28 then performs its normal fare deduction 120 on the smart card, and sends an EU65 message to the central computer describing both the autoload and the value deducted from the card. The central computer 12 determines whether adjustments are required 122, adjusts the debit if necessary 124, and updates the patron benefits data base 14, step 126. The transactions and messages from the bus fare box 26 are stored in the fare box 26 and uploaded to the central computer 12 by means of a depot computer.

If a patron is eligible for multiple benefits, then the autoload list stored in the gates and fare boxes 28, 26 will include the control numbers and amounts for each benefit. The maximum number of control numbers allowed for each smart card is dependent upon the memory available on the smart card 34, and the available memory at the transit devices 28, 26. Each control number requires one (1) byte, and each amount requires two (2) bytes. Thus, if the patron is eligible for four benefits, twelve (12) bytes will be required to store the information on the smart card 34.

In a preferred embodiment of the invention, a patron's available benefits are automatically loaded onto his or her smart card according to a set of autoload rules that are downloaded to the gates 28 and fare boxes 26. For example, the autoload process is initiated when the value remaining on the smart card drops below a threshold amount, or on a specific calender date. More than one rule may be applied. The rules are established by transit authority operators, and may be based upon enrollment agreements between the customer, i.e., the patron's employer, and the transit authority. If a patron wishes to add value to his or her smart card, transit vending machines, which directly communicate with the central computer in real time, allow the patron a variety of options for adding value to the smart card. In the preferred embodiment, the smart card applies a ceiling as to the value that is on the card. For example, the value remaining on the card will not exceed $200. The ceiling may be established for all smart cards, or according to the autoload rules. Technology limitations and/or security measures may also dictate the maximum value supported on a smart card.

Withdrawal from the Benefits Autoload Program. The customer, e.g., the employer that authorizes the patron benefits, may remove the patron from receiving benefits. In a preferred embodiment, the customer may request the transit authority to remove the patron using, e.g., a point of issue device 42, as shown in FIG. 1. The customer may also have authorized access to request a withdrawal utilizing, e.g., a personal computer 44 through an Internet link 46 to the transit authority central computer 12. A patron may discontinue use of the smart card, and no further autoloads will be performed. Discontinued use may be voluntary, or involuntary in a situation such as termination of employment wherein the patron turns in the smart card to his or her employer. The transit authority may also withdraw a patron from the benefits autoload program. For example, a lost smart card may be hot-listed by means of a Negative List screen which denies a patron any or limited cash-only use of the smart card.

Benefits Last Load Recall Process. Situations may occur that a patron receives a benefit that is not available. For example, a benefit may be withdrawn for use after it has already been received by the patron by means of a benefit autoload or a request at a vending machine. A last load recall process presents various means by which an amount may be recalled. In one embodiment, the last load recall is a manual process in which the transit authority adjusts the patron's smart benefits account if the recall value is available in the account. In another embodiment, the patron's account status indicates a debit amount which is resolved once a new benefit is added to the patron's account.

Credit Card Autoload Initialization. The credit card autoload process charges all cash values added to a smart card to the patron's credit card. To participate in the credit card autoload process, a patron must first register his intent to use his credit card as the autoload source or vehicle. Referring to FIG. 1, the smart card 34 may be registered for credit card autoload at a transit vending machine 30, a point of issue device 42, or personal computer 44 through a transit authority Internet web site 46 as long as these devices have capability for credit/debit processing. In addition, if the Internet web site 46 option is used to initialize credit card autoload, the smart card must already have been issued to the patron at a point of issue device 42.

Figure 5:
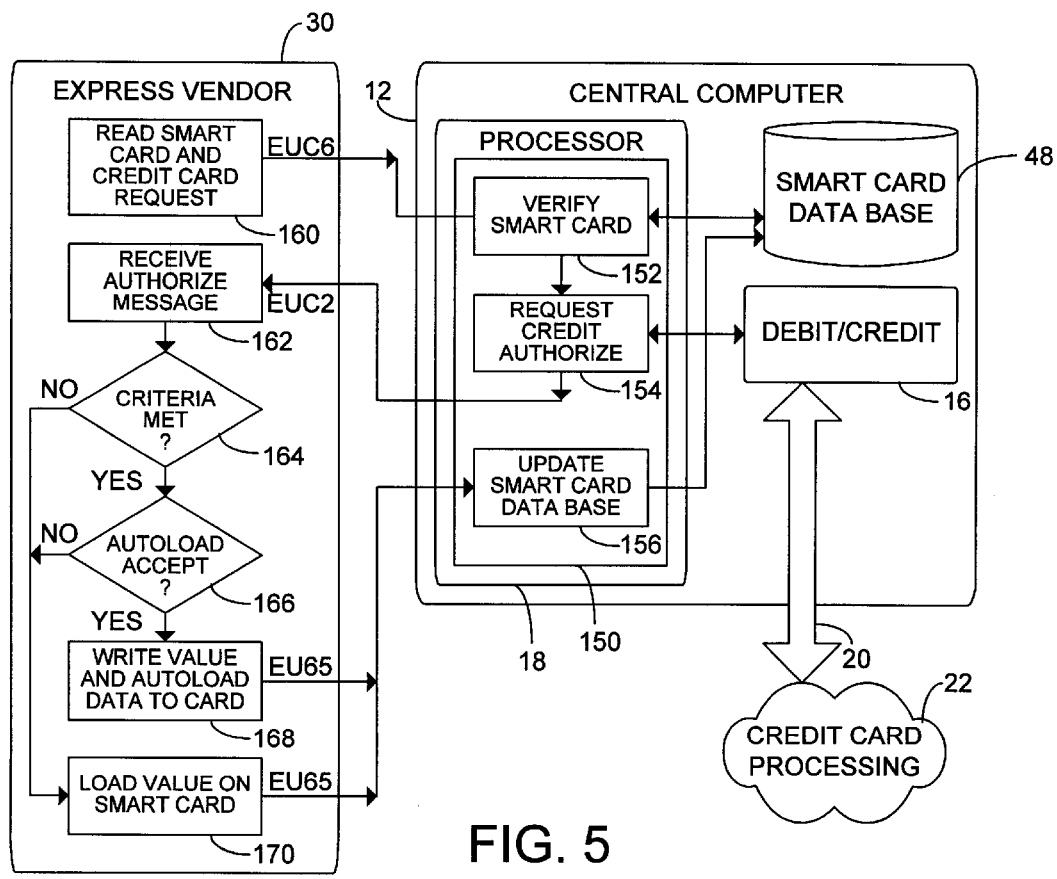
FIG. 5 illustrates the credit card autoload initialization process.

Referring to FIG. 1 and FIG. 5, when a patron presents his or her smart card 34 to the reader/writer 32 of, e.g., a transit vending machine 30, the vending machine 30 reads the smart card 160 and offers a variety of payment options to the patron. If the patron opts to load a value onto the smart card using a credit card, he or she must present a credit card for approval by a credit card processing center 22. To accomplish this, the transit vending machine 30 appends the smart card serial number to a credit card authorization request (EUC6) sent to the central computer 12. The central computer 12 verifies the smart card 152, including determining whether the smart card is registered in the smart card data base 48. The central computer 12 then requests credit card authorization 154 through a debit/credit process 16 in order to establish communication 20 with a credit card processing center 22. Upon validation of the debit/credit process 16, the central computer sends a response message (EUC2) to the vending machine 30.

Upon receipt of the response message (EUC2) 162, the vendor 30 determines whether the patron is eligible to participate in the credit card autoload based upon a number of autoload criterion 164. If the patron is eligible, the autoload option is offered for selection by the patron. In a preferred embodiment of the invention, the credit card autoload process is offered to any patron according one or any combination of the following autoload criterion:

1. The smart card 34 is used in a credit request transaction;
2. The smart card 34 is registered in the central computer 12 smart card database 48;

3. The smart card 34 is not registered for the benefits autoload function;
4. The credit card request transaction is approved;
5. The smart card 34 is either not set up for autoload or the card is set up for autoload and the credit card used in the current transaction is not the same credit card that was used to initially setup autoload;
6. The smart card 34 is setup for autoload, and the patron has asked for a different credit card as the payment vehicle;
7. The transaction meets a minimal price for the value loaded; and
8. The credit card expiration date is at least six months out.

If the patron accepts the credit card autoload offer 166, one or two explanatory panels of data are presented at the vending machine 30 explaining the autoload process and referencing any available patron educational material. If the patron opts to proceed with the credit card autoload process, the patron is prompted to select the value for autoload, e.g. $20 for each autoload transaction. In the preferred embodiment, the patron also may specify the threshold value for triggering the autoload process, e.g., the smart card has a value less than $5, as well as a maximum value limit for the card. Triggering events, threshold values, and maximum limits may be pre-determined according to rules established by the transit authority. The credit card autoload value represents the monetary amount that will automatically be loaded onto a patron's smart card each time he or she presents the smart card to a gate or fare box, and a triggering event is satisfied. The autoload value will be added to the smart card up to the maximum value limit, or ceiling amount, e.g., $200.

Upon receipt of all patron selections, the vending machine 30 sets up the smart card 34 for autoload 168, and the requested value is added to the smart card. The autoload data includes one (1) bit of an autoload flag bit which is set to "on" for an approved autoload, nine (9) bytes of "Track 2" data which include the primary account number (PAN) and the expiration date of the credit card, one (1) byte for the purse code, and two (2) bytes for the autoload amount. The initialization is completed by the vending machine 30 transmitting a detail transaction data message (EU65) message to the central computer 12. Upon receipt of EU65 message, the central computer 12 updates the a smart card data base 48 which contains the serial numbers and patron information for all registered smart cards, to indicate that the smart card 34 is initialized for credit card autoload, step 156. If the patron does not choose the credit card autoload 166 option, then the requested monetary value is added to the smart card 170.

Figure 3:
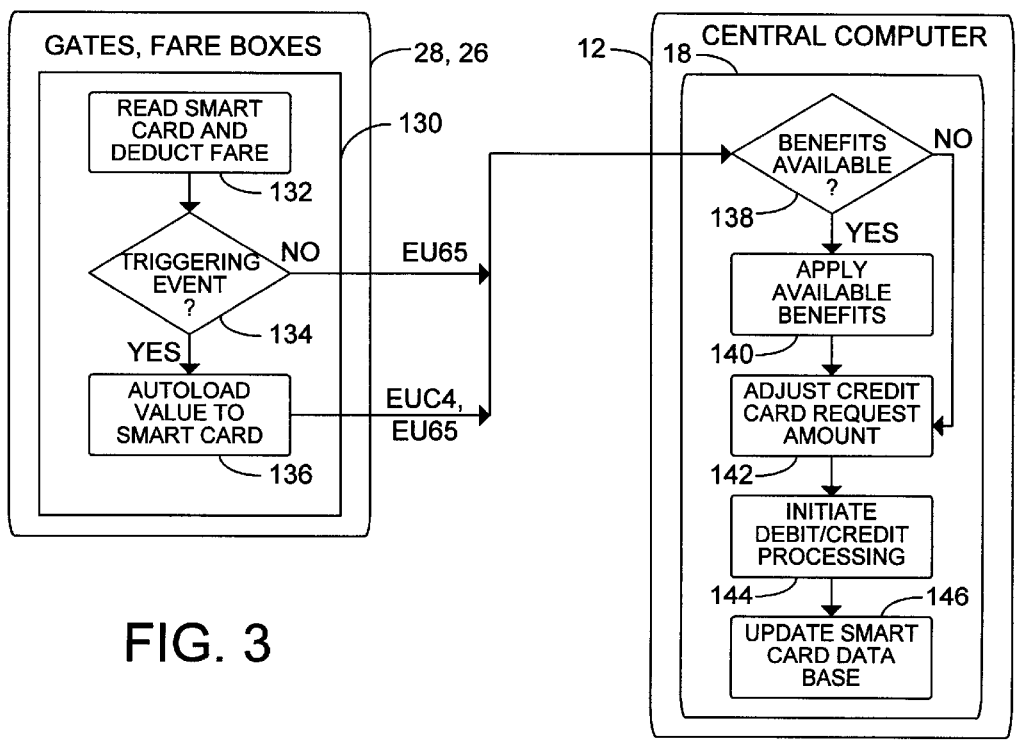
FIG. 3 is an illustration of the credit card autoload process.

Credit Card Autoload Process. A patron need only present a smart card that is registered for the credit card autoload process to a transit gate 28 or fare box 26 to have a value added to the smart card 34 if the value of the smart card falls below a pre-determined minimum. Referring to FIG. 3, the patron presents a smart card to the gate or fare box 28, 26 and the fare is deducted from the smart card 132. If a triggering event is detected 134, then a patron-specified credit card autoload value is added to the smart card 136 and the patron is allowed entry. The device 28, 30 displays a message indicating that the smart card was autoloaded. In a preferred embodiment of the credit card autoload process, the criteria for initiating autoload at the gate is that the autoload bit of the smart card is set to "on", and the value on a value-based card is below a specified level. If the payment vehicle stored on the smart card 34 is within, e.g., forty-five (45) days of expiration, each use of the smart card 34 causes a warning message to be displayed to the patron at the gate or fare box 28, 26. If the payment vehicle has expired, autoload is not performed and the patron is refused entry when the smart card value, rides or time is exhausted.

If the criteria is met, the vending machine 30 sends a force post message (EUC4) to the central computer 12. In addition, a detail transaction message (EU65) containing information about the autoload is sent to the central computer 12. This information contains the value added to the smart card 34. The central computer 12 recognizes the EUC4 as a credit card autoload request, and determines whether any benefits are available to satisfy the request 138. Any available benefits are applied to the credit request 140, and the credit card request amount is adjusted accordingly 142. If an additional amount is required to satisfy the request, the EUC4 message is sent to the credit card service company 144 for processing. The smart card data base 48 is updated to reflect the transaction, step 146. If the transaction is not authorized, the update to the database will include a negative list flag as explained below.

In the preferred embodiment of the credit card autoload process, bonuses are included in either the credit adjustment 142 or in the update of the smart card data base 146 according to pre-determined bonus rules. For example, if a patron requests $20 to be added to his or her smart card by a credit transaction, the patron will receive an actual added value of $22.

Smart cards 34 that are initialized for the credit card autoload process are not included in the benefits autoload list sent to the devices 28, 26. Patron benefits are applied to the smart card 34 by the central computer 12 before being sent as a force post in the credit card processing 16. In this way all available benefits are applied by the central computer 12 when processing a credit card autoload request.

Transit Authority Support. The autoload system of the preferred embodiment may require administrative effort by the transit authority to ensure proper decisions are made when processing a rejected autoload request. The rejection processing needs a qualified administrator to analyze the rejection data and select a proper recovery option. When the patron's smart card is automatically loaded in a credit card autoload, the gate 28 generates a EUC4 force post/advice transaction message which is an ISO 8583 transaction implemented for the debit/credit system. A value is added to a patron's smart card before credit authorization is requested from the issuer, and thus, the transaction could be refused when received by the issuer. Any refused transactions are returned to the transit authority which must research all refused transactions as a normal part of the debit/credit administrative support and determine whether a card should be withdrawn or added to a negative list as described below. In other embodiments of the invention, the actions taken upon a refused credit card authorization are processed automatically by the central computer 12.

Negative list. In a preferred embodiment of the credit card autoload process, when it is determined that the credit card transaction was refused, the serial number of the smart card may be added to a negative list, or alternatively, the smart card data base 48 is updated to include an appropriate flag or code in the status of the smart card. A flag or code indicates the actions that should be taken when the patron next presents the smart card at a transit device. In the preferred embodiment, the credit card autoload bit on the smart card is set to "off" to disallow further credit card autoload. The patron may reset the autoload by visiting a vending machine and re-initializing the credit card autoload process utilizing, e.g., another valid credit card. Another action that may be taken to reclaim the credit card autoload value is to debit any available patron benefits. If patron benefits are not available, then the autoload bit on the smart card is set to "off", and the smart card is debited to remove the value of the last autoload from the card. The debit may result in a negative value on the smart card 34. This will result in the patron being refused entry to the gate, at which time, he or she must add value to the smart card at a vending machine 30.

Withdrawal from the Credit Card Autoload Process. The patron may discontinue use of the smart card and no further automatic value loads will be performed. The patron may visit a vending machine 30 to remove the setup bit via a menu specification. This action is reported to the central computer via an EU65 message element type (MET), and the patron's smart card status is updated to reflect the change. The transit authority may also initiate withdrawal by changing the status in the smart card data base 48 and/or adding the card to a negative list.

Smart Card Requirements. A smart card of a preferred embodiment for use with the benefits autoload processes requires three (3) bytes of memory to store the purse amount and the benefit control number. Multiple available benefits will require additional storage. For example, four (4) benefit entries may be stored on a card for a total of twelve (12) bytes. A smart card for use only with the credit card autoload process requires three (3) bytes of memory to store the purse amount and a control number and one autoload "on" or "off" bit. The combination of the two autoload processes requires the sum total of storage space needed for the benefit autoload process and the credit card autoload process. In the preferred embodiment, read/write access time is reduced by accessing only the needed data for certain functions.

Gate Requirements. The benefits autoload process of the preferred embodiment of the present invention requires one megabyte of device memory per 100,000 autoload entries in an autoload list. The credit card autoload does not require gate storage. Each gate is loaded with a complete benefits autoload list at regular intervals. Benefits are not applied to a smart card while the gate is receiving the autoload table. This download process presents a window at each gate when a patron can not receive benefits. This effects of this window may be minimized by creating and downloading the autoload lists early in the transportation day.

Fare Box Requirements. The autoload list is loaded into the bus fare boxes 26 by a bus depot probe. Bus fare boxes 26 typically have a multi-megabyte table storage capacity, and the number of table entries does not impose a resource problem. However, transfer times are longer utilizing a probe in comparison with the downloads to the transit gates 28 since the probe devices have a smaller bandwidth. Thus, it is desirable to reduce the number of table entries that must be transferred to bus fare boxes 26. One method for reducing the autoload list is to create a bus-only autoload list. Patrons who are not registered on this list do not have access to automatic loading of their benefits at the fare box 26, but they do have the option of credit card autoload.

Sample Autoload Cases. The following cases and accompanying tables illustrate the benefits autoload process and the credit card autoload process of a preferred embodiment of the present invention. Case 1 illustrates a single autoload which first occurs at a transit gate, and Case 2 illustrates a single autoload which first occurs at a transit vending machine. Case 3 illustrates multiple autoload amounts using a gate first, and Case 4 illustrate multiple autoload amounts using a vending machine first. Case 5 steps through a typical bus-only autoload transaction where the smart card value exceeds a maximum limit. Case 6 illustrates a credit card autoload with available benefits that are less than the autoload amount. Case 7 is a credit card autoload wherein the available benefits are greater than the autoload amount.

Case 1: One Autoload Amount Using a Gate First. Table 3 illustrates data at start of day on a smart card, in the autoload list downloaded to the gates and fare boxes 28, 26, and in the benefits table 14 of the central computer 12.

TABLE 3

Case 1 Initial Values

| Smart Card Data | Gate Autoload List | Fare Box Autoload List | Central Computer Benefits Table |
|---|---|---|---|
| Ctl#: 0 | Ctl#: 123 | Ctl#: 123 | Ctl#: 123 |
| Amt: 0 | Amt: $65.00 | Amt: $65.00 | Amt: $65.00 |
| Ctl#: 0 | | | |
| Amt: 0 | | | |
| Ctl#: 0 | | | |
| Amt: 0 | | | |
| Ctl#: 0 | | | |
| Amt: 0 | | | |
| Amt remaining: $10.00 | | | |

In an Action A, the patron passes through a gate 28 with the following resulting actions, as shown in Table 4:

a. the gate 28 adds the amount from the benefits autoload (AL) table to Amount Remaining field on the smart card 34 (assuming no minimum level trigger);
b. the gate 28 writes the control number and amount to the smart card 34;
c. the gate 28 sends a claim confirmation message to the central computer 12 which contains the control number (123) and amount claimed ($65.00); and
d. the central computer 12 creates a claim row and applies the claim request amount against row 1 on the benefits table.

In an Action B, the patron tries to get $25.00 of benefits from the vending machine 30 at the end of her trip. The vending machine 30 sends the benefits request to the central computer 12. The data in the request message includes the control numbers and the amounts contained on the card. The central computer 12 recognizes that there are no more benefits for this smart card 34 and returns zero for amount authorized in the return message to the vending machine 30 which displays that no benefits are available.

In an Action C, the patron enters the gate 28 on a return trip. The gate 28 compares the smart card's control number with the control numbers in the autoload list table. The control numbers match, and autoload processing will not be initiated. In a last Action D, the patron enters a bus after leaving the rail system. The fare box 26 compares the smart card's control number with the control numbers on the autoload list table. The control numbers match, and autoload processing will not be initiated.

TABLE 4

Case 1 Updated Values After Action A

| Smart Card Data | Gate Autoload List | Fare Box Autoload List | Central Computer Benefits Table |
|---|---|---|---|
| Ctl#: 123 | Ctl#: 123 | Ctl#: 123 | Ctl#: 123 |
| Amt: $65.00 | Amt: $65.00 | Amt: 65.00 | Amt: $0 |
| Ctl#: 0 | | | |
| Amt: 0 | | | |
| Ctl#: 0 | | | |
| Amt: 0 | | | |

TABLE 4-continued

Case 1 Updated Values After Action A

| Smart Card Data | Gate Autoload List | Fare Box Autoload List | Central Computer Benefits Table |
|---|---|---|---|
| Ctl#: 0 | | | |
| Amt: 0 | | | |
| Amt remaining: $75.00 | | | |

Case 2: One Autoload amount Using a Vendor First. Table 5 illustrates data at start of day on a smart card 34. In a first Action A, the patron uses a vending machine 30 to receive $20.00 of benefits, with the following resulting actions, as shown in Table 6:

a. the vending machine 30 sends a benefits request to central computer 12 with control numbers and amounts in the message equal to zero;
b. the central computer 12 returns a message with an authorized amount of $65.00 for control number 123;
c. the patron selects $20.00;
d. the vendor 30 adds $20.00 to the card's Amount Remaining;
e. the vendor writes the control number and the amount ($20.00) to the card;
f. the vendor sends a confirmation message containing the control number and the amount ($20.00) to the central computer 12; and
g. the central computer 12 creates a claim for $20.00 and reduces the benefit amount remaining by the same amount.

TABLE 5

Case 2 Initial Values

| Smart Card Data | Gate Autoload List | Fare Box Autoload List | Central Computer Benefits Table |
|---|---|---|---|
| Ctl#: 0 | Ctl#: 123 | Ctl#: 123 | Ctl#: 123 |
| Amt: 0 | Amt: $65.00 | Amt: $65.00 | Amt: $65.00 |
| Ctl#: 0 | | | |
| Amt: 0 | | | |
| Ctl#: 0 | | | |
| Amt: 0 | | | |
| Ctl#: 0 | | | |
| Amt: 0 | | | |
| Amt remaining: $10.00 | | | |

TABLE 6

Case 2 Updated Values After a Vendor First Transaction

| Smart Card Data | Gate Autoload List | Fare Box Autoload List | Central Computer Benefits Table |
|---|---|---|---|
| Ctl#: 123 | Ctl#: 123 | Ctl#: 123 | Ctl#: 123 |
| Amt: $20.00 | Amt: $65.00 | Amt: $65.00 | Amt: $45.00 |
| Ctl#: 0 | | | |
| Amt: 0 | | | |
| Ctl#: 0 | | | |
| Amt: 0 | | | |
| Ctl#: 0 | | | |
| Amt: 0 | | | |
| Amt remaining: $30.00 | | | |

In an Action B, the patron enters a gate 28. The gate 28 compares the smart card's control number with the control numbers on the autoload list. The control numbers match, and autoload is not initiated. In an Action C, the patron visits a vending machine 30 at the end of her ride to claim an additional $15.00. The fare for the trip ($2.00) was deducted from card's Amount Remaining, now $28.00. The vending machine 30 sends a request for benefits to the central computer 12. The request includes control number 123 and control number amount of $20.00. The central computer 12 returns an authorized amount of $45.00 for Control Number 123. The control number and amount are contained in the return message. The vending machine 30 adds $15.00 to the card's Amount Remaining, writes the control number and $15.00 to the control number amount on the smart card 34. The vending machine 30 sends a confirmation message to the central computer 12 which contains the control number and the amount ($15.00). The central computer 12 creates a claim for $15.00 and reduces the benefit amount remaining by the same amount.

TABLE 7

Case 2 Updated Values After Action C

| Smart Card Data | Gate Autoload List | Fare Box Autoload List | Central Computer Benefits Table |
|---|---|---|---|
| Ctl#: 123 | Ctl#: 123 | Ctl#: 123 | Ctl#: 123 |
| Amt: $35.00 | Amt: $65.00 | Amt: $65.00 | Amt: $30.00 |
| Ctl#: 0 | | | |
| Amt: 0 | | | |
| Ctl#: 0 | | | |
| Amt: 0 | | | |
| Ctl#: 0 | | | |
| Amt: 0 | | | |
| Amt remaining: $43.00 | | | |

In an Action D, the patron enters a bus after leaving the rail system. The fare box 26 compares the smart card's control number with the control numbers on the autoload list. The control numbers match and autoload is not initiated. The bus ride costs $1.00 which is deducted from the smart card 34 for an Amount Remaining of $42.00. In an Action E, the patron visits a vendor 30 the next day to claim an additional $65.00, with the following resulting actions, as shown in Table 8:

a. the vendor 30 sends request for benefits with the control number 123 and a control number amount of $35.00 to the central computer 12;
b. the central computer 12 subtracts the control number amount of $35.00 dollars from the benefits available ($65.00) for a difference of $30.00;
c. the central computer 12 returns an authorized amount of $30.00 for control number 123, and the vendor 30 displays $30.00 as the maximum amount available;
d. the patron selects $30.00, and the vendor 30 adds $30.00 to the card's Amount Remaining;
e. the vendor 30 writes the control number and adds $30.00 to the control number amount on the card.
f. the vendor 30 sends a confirmation message to the central computer 12 containing the control number and the amount ($30.00); and
g. the central computer 12 creates a claim for $30.00 and reduces the benefit amount remaining by the same amount.

TABLE 8

Case 2 Updated Values After Action E

| Smart Card Data | Gate Autoload List | Fare Box Autoload List | Central Computer Benefits Table |
|---|---|---|---|
| Ctl#: 123 | Ctl#: 123 | Ctl#: 123 | Ctl#: 123 |
| Amt: $65.00 | Amt: $65.00 | Amt: $65.00 | Amt: $0 |
| Ctl#: 0 | | | |
| Amt: 0 | | | |
| Ctl#: 0 | | | |
| Amt: 0 | | | |
| Ctl#: 0 | | | |
| Amt: 0 | | | |
| Amt remaining: $72.00 | | | |

Case 3: Multiple Autoload Amounts Using a Gate First. Table 9 illustrates a case where three different jobs are run to create the autoload (AL) table. Three different control numbers are created if the patron has valid benefits created for him on three different days, and the patron does not use the smart card during this time period. If all five (5) benefits are available at the same time, only one control number is created. That is, if all five benefits are available at the start of an autoload table create job, the job creates only one entry in the autoload table.

In a first Action A the patron enters through a gate 28, with the following resulting actions, as shown in Table 10:
a. the gate 28 compares the smart card control numbers against numbers on the autoload list with the result that no matches are found and all amounts in the autoload list are available for loading;
b. the gate 28 adds the total of the autoload list amounts to the value remaining on the card ($54.00);
c. the gate 28 writes the control numbers and their amounts to the card;
d. the gate 28 sends a claim confirmation message to the central computer containing control numbers (081, 082, and 083) and amounts claimed ($36.00, $5.00, and $13.00); and
e. the central computer creates five claim rows and applies the claim request amounts against rows 1 through 5 on the benefits table.

TABLE 9

Case 3 Data after Day 3 Auto Load Processing

| Smart Card Data | Gate Autoload List | Fare Box Autoload List | Central Computer Benefits Table |
|---|---|---|---|
| Ctl#: 0 | Ctl#: 081 | Ctl#: 081 | Day 1 benefits |
| Amt: 0 | Amt: $36.00 | Amt: $36.00 | Ctl#: 081 |
| Ctl#: 0 | Ctl#: 082 | Ctl#: 082 | Amt: $25.00 |
| Amt: 0 | Amt: $5.00 | Amt: $5.00 | Ctl#: 081 |
| Ctl#: 0 | Ctl#: 083 | Ctl#: 083 | Amt: $11.00 |
| Amt: 0 | Amt: $13.00 | Amt: $13.00 | Day 2 benefits |
| Ctl#: 0 | | | Ctl#: 082 |
| Amt: 0 | | | Amt: $5.00 |
| Amt remaining: $10.00 | | | Day 3 benefits |
| | | | Ctl#: 083 |
| | | | Amt: $3.00 |
| | | | Ctl#: 083 |
| | | | Amt: $10.00 |

In an Action B, the patron attempts to get $25.00 of benefits from the vendor 30 after the trip. The vendor 30 sends the benefits request to the central computer 12. The data in the request message includes the control numbers and the amounts contained on the card 34. The central computer compares the amounts ($36.00, $5.00, and $13.00) already used from control numbers 081, 082, and 083. These amounts are subtracted from the benefits available on the benefits table. A zero or negative difference indicates that no benefits are available. If the previous claim confirmation was not applied to the benefits the subtraction result is zero. With $0 balances the result is negative. The central computer 12 returns a message that contains zero as the amount authorized. The vendor 30 informs the patron that no benefits are available.

TABLE 10

Case 3 Updated Values After a First Transaction

| Smart Card Data | Gate Autoload List | Fare Box Autoload List | Central Computer Benefits Table |
|---|---|---|---|
| Ctl#: 081 | Ctl#: 081 | Ctl#: 081 | Day 1 benefits |
| Amt: $36.00 | Amt: $36.00 | Amt: $36.00 | Ctl#: 081 |
| Ctl#: 082 | Ctl#: 082 | Ctl#: 082 | Amt: $0 |
| Amt: $5.00 | Amt: $5.00 | Amt: $5.00 | Ctl#: 081 |
| Ctl#: 083 | Ctl#: 083 | Ctl#: 083 | Amt: $0 |
| Amt: $13.00 | Amt: $13.00 | Amt: $13.00 | Day 2 benefits |
| Ctl#: 0 | | | Ctl#: 082 |
| Amt: 0 | | | Amt: $0 |
| Amt remaining: $64.00 | | | Day 3 benefits |
| | | | Ctl#: 083 |
| | | | Amt: $0 |
| | | | Ctl#: 083 |
| | | | Amt: $0 |

In an Action C, the patron enters a gate 28 on a return trip. The gate 28 compares the smart card's control number with the control numbers in the autoload list. The control numbers match, and autoload is not processed. In an Action D, the patron enters a bus after leaving the rail system. The bus fare box 26 compares the smart card's control number with the control numbers in the autoload list. The control numbers match, and autoload is not processed.

Case 4: Multiple Autoload Amounts Using a Vendor First. Table 11 illustrates a case where three different jobs are run to create the autoload (AL) table. In a preferred embodiment, this job runs every morning. Three different control numbers are created if the patron has valid benefits created for him on three different days, and the patron did not use the smart card during this time period. If all five (5) benefits are available at the same time, only one control number is created. This case uses only general purse benefits.

TABLE 11

Case 4 Data after Day 3 Auto Load Processing

| Smart Card Data | Gate Autoload List | Fare Box Autoload List | Central Computer Benefits Table |
|---|---|---|---|
| Ctl#: 0 | Ctl#: 081 | Ctl#: 081 | Day 1 benefits |
| Amt: 0 | Amt: $36.00 | Amt: $36.00 | Ctl#: 081 |
| Ctl#: 0 | Ctl#: 082 | Ctl#: 082 | Amt: $25.00 |
| Amt: 0 | Amt: $5.00 | Amt: $5.00 | Ctl#: 081 |
| Ctl#: 0 | Ctl#: 083 | Ctl#: 083 | Amt: $11.00 |
| Amt: 0 | Amt: $13.00 | Amt: $13.00 | Day 2 benefits |
| Ctl#: 0 | | | Ctl#: 082 |
| Amt: 0 | | | Amt: $5.00 |
| Amt remaining: $10.00 | | | Day 3 benefits |
| | | | Ctl#: 083 |
| | | | Amt: $3.00 |
| | | | Ctl#: 083 |
| | | | Amt: $10.00 |

In an Action A, the patron uses a vendor 30 to receive $40.00 of benefits, with the following resulting actions, as shown in Table 12:

a. the vendor 30 sends a benefits request to the central computer 12. The control numbers and amounts in the message are all zero;
b. the central computer 12 gathers the benefits from the rows available on the benefits table using the sequence in which they were created (1 thru 5);
c. the central computer 12 returns a message for a total authorized amount of $54.00 with the control numbers contained in the return message (Ctl #081, #082, #083; Amounts $36.00, $5.00 $13.00);
d. the vendor 30 adds $40.00 to the smart card's Amount Remaining using the oldest control numbers to create this amount;
e. the vendor 30 writes the control numbers and amounts to the card (Ctl #081, #082; Amount $36.00, $4.00);
f. the vendor 30 sends a confirmation message to the central computer 12 containing the control numbers and the amounts listed above;
g. the central computer 12 creates claims for the benefits used; and
h. the central computer 12 reduces the amount remaining on the benefits table.

TABLE 12

Case 4 Updated Values After Action A

| Smart Card Data | Gate Autoload List | Fare Box Autoload List | Central Computer Benefits Table |
|---|---|---|---|
| Ctl#: 081 | Ctl#: 081 | Ctl#: 081 | Day 1 benefits |
| Amt: $36.00 | Amt: $36.00 | Amt: $36.00 | Ctl#: 081 |
| Ctl#: 082 | Ctl#: 082 | Ctl#: 082 | Amt: $0 |
| Amt: $4.00 | Amt: $5.00 | Amt: $5.00 | Ctl#: 081 |
| Ctl#: 0 | Ctl#: 083 | Ctl#: 083 | Amt: $0 |
| Amt: 0 | Amt: $13.00 | Amt: $13.00 | Day 2 benefits |
| Ctl#: 0 | | | Ctl#: 082 |
| Amt: 0 | | | Amt: $1.00 |
| Amt remaining: | | | Day 3 benefits |
| $50.00 | | | Ctl#: 083 |
| | | | Amt: $3.00 |
| | | | Ctl#: 083 |
| | | | Amt: $10.00 |

In an Action B, the patron enters a gate 28, with the following resulting actions, as shown in Table 13:
a. the gate 28 compares the smart card's control number with the control numbers in the autoload list—two control numbers match (081 and 082) and one does not match (083);
b. the gate 28 adds the amount ($13.00) for control number 083 to the Amount Remaining on the card;
c. the gate 28 writes the control number (083) and amount ($13.00) to the card;
d. the gate 28 sends a claim request message to the central computer 12 containing the control number (083) and amount to be claimed; and
e. the central computer 12 applies the claim request amount against rows 4 and 5 on the benefits table 14.

The total amount available for autoload was $54.00, and the total amount claimed is $53.00. Therefore, row 3 on the benefits table has $1.00 of benefits remaining. The patron must go to a vendor 30 to receive this last amount of $1.00. The control numbers on the smart card prevent the patron from receiving this last amount with an autoload process.

TABLE 13

Case 4 Updated Values After Action B

| Smart Card Data | Gate Autoload List | Fare Box Autoload List | Central Computer Benefits Table |
|---|---|---|---|
| Ctl#: 081 | Ctl#: 081 | Ctl#: 081 | Day 1 benefits |
| Amt: $36.00 | Amt: $36.00 | Amt: $36.00 | Ctl#: 081 |
| Ctl#: 082 | Ctl#: 082 | Ctl#: 082 | Amt: $0 |
| Amt: $4.00 | Amt: $5.00 | Amt: $5.00 | Ctl#: 081 |
| Ctl#: 083 | Ctl#: 083 | Ctl#: 083 | Amt: $0 |
| Amt: $13.00 | Amt: $13.00 | Amt: $13.00 | Day 2 benefits |
| Ctl#: 0 | | | Ctl#: 082 |
| Amt: 0 | | | Amt: $1.00 |
| Amt remaining: | | | Day 3 benefits |
| $63.00 | | | Ctl#: 083 |
| | | | Amt: $0 |
| | | | Ctl#: 083 |
| | | | Amt: $0 |

Case 5: Bus Only Autoload where Card Remaining Value Exceeds a Card Maximum Limit. FIG. 14 illustrates a Case 5 for a bus-only autoload where the card remaining value is just below a card maximum limit of $200 with no minimum autoload trigger, i.e., autoload occurs until the limit is reached.

TABLE 14

Case 5 Bus Only Autoload with Maximum Limit

| Smart Card Data | Gate Autoload List | Fare Box Autoload List | Central Computer Benefits Table |
|---|---|---|---|
| Ctl#: 0 | | Ctl#: 123 | Ctl#: 123 |
| Amt: 0 | | Amt: $65.00 | Amt: $65.00 |
| Ctl#: 0 | | | |
| Amt: 0 | | | |
| Amt remaining: | | | |
| $195.00 | | | |

In an Action A, the patron rides the bus. The fare box 26 adds $5.00 to the Amount Remaining field on the patron's smart card 34. The fare box 26 also writes the Control Number and amount to the card. The fare box 26 creates a claim confirmation message containing the control number (123) and amount claimed ($5.00). The bus fare box 26 is scheduled to be probed later in the evening. Table 15 shows the results of Action A.

TABLE 15

Case 5 Updated Values After Action A

| Smart Card Data | Gate Autoload List | Fare Box Autoload List | Central Computer Benefits Table |
|---|---|---|---|
| Ctl#: 123 | | Ctl#: 123 | Ctl#: 123 |
| Amt: $5.00 | | Amt: $65.00 | Amt: $65.00 |
| Ctl#: 0 | | | |
| Amt: 0 | | | |
| Amt remaining: | | | |
| $200.00 | | | |

In an Action B, the patron is charged $2.50 for a bus ride. The patron then uses the rail system to go to work and back to the bus stop for a total rail cost of $3.75. The amount remaining on patron's card just before getting on the bus is $193.75. Since this is a bus-only autoload patron, none of the rail transactions add benefits to the card. The patron gets on a bus to go home. The bus fare box 26 autoloads $6.25 to the Amount Remaining field on the patron's smart card. The fare box 26 adds the amount to the control number amount on the card. The fare box 26 creates a claim confirmation message containing the control number (123) and amount claimed ($6.25). Table 16 shows the results of Action A.

TABLE 16

Case 5 Updated Values After Action B

| Smart Card Data | Gate Autoload List | Fare Box Autoload List | Central Computer Benefits Table |
|---|---|---|---|
| Ctl#: 123 | | Ctl#: 123 | Ctl#: 123 |
| Amt: $11.25 | | Amt: $65.00 | Amt: $65.00 |
| Ctl#: 0 | | | |
| Amt: 0 | | | |
| Amt remaining: | | | |
| $200.00 | | | |

In an Action C the bus fare boxes 26 are probed. The bus depot sends transactions (EUB5 messages) to the central computer 12. The total of the two claims is $11.25. The central computer 12 creates two claims, one for $5.00 and another for $6.25, and deducts the amount of these claims from benefit amount in Row 1 on the benefits table as shown in Table 17. The above actions can repeat until the benefit amount is reduced to zero or the benefit expires.

TABLE 17

Case 5 Updated Values After Action C

| Smart Card Data | Gate Autoload List | Fare Box Autoload List | Central Computer Benefits Table |
|---|---|---|---|
| Ctl#: 123 | | Ctl#: 123 | Ctl#: 123 |
| Amt: $5.00 | | Amt: $65.00 | Amt: $53.75 |
| Ctl#: 0 | | | |
| Amt: 0 | | | |
| Amt remaining: | | | |
| $200.00 | | | |

Case 6: Credit Card Autoload with Benefits Less than the Autoload Amount. In this case the autoload value is $50, and a minimum limit for triggering autoload is $7.00. Table 18 shows initial values for Case 6.

TABLE 18

Case 6 Initial Values

| Smart Card Data | Gate Autoload List | Fare Box Autoload List | Central Computer Benefits Table |
|---|---|---|---|
| P/P Code: 128 | | | Amt: $35.00 |
| Amt: 50.00 | | | |
| Amt remaining: | | | |
| $.50 | | | |

In an Action A, the patron enters the rail system at a gate 28. The gate 28 adds $50.00 to the Amount Remaining field on the patron's smart card 34. The gate 28 sends a force post (EUC4) message to the central computer for amount of $50.00. The central computer recognizes the EUC4 as a credit card autoload request and creates a claim for the $35.00 available on the benefits table. The central computer forwards an EUC4 requests to the credit card processing 22 for the difference of $15.00. The central computer creates a confirmation row for $15.00 as shown in Table 19.

TABLE 19

Case 6 Updated Values After Action A

| Smart Card Data | Gate Autoload List | Fare Box Autoload List | Central Computer Benefits Table |
|---|---|---|---|
| P/P Code: 128 | | | Amt: $0 |
| Amt: 50.00 | | | |
| Amt remaining: | | | |
| $50.50 | | | |

Case 7: Credit Card Autoload with Benefits Greater than the Autoload Amount. In this case the autoload value is $50, and a minimum limit for triggering autoload is $7.00. Table 20 shows initial values for Case 7. In an Action A, the patron enters a rail system at a gate 28. The gate 28 adds $50.00 to the Amount Remaining field on the patron's smart card, and sends a force post (EUC4) to the central computer for an amount of $50.00. The central computer 12 recognizes the EUC4 as a credit card autoload request, and creates a claim for the $50.00 available on the benefits table. The central computer creates a confirmation row for $50.00, as shown in Table 21.

TABLE 20

Case 7 Updated Values After a First Transaction

| Smart Card Data | Gate Autoload List | Fare Box Autoload List | Central Computer Benefits Table |
|---|---|---|---|
| P/P Code: 128 | | | Benefit 1 |
| Amt: 50.00 | | | Amt: $65.00 |
| Amt remaining: | | | |
| $3.50 | | | |

TABLE 21

Case 7 Updated Values After Action A

| Smart Card Data | Gate Autoload List | Fare Box Autoload List | Central Computer Benefits Table |
|---|---|---|---|
| P/P Code: 128 | | | Benefit 1 |
| Amt: 50.00 | | | Amt: $15.00 |
| Amt remaining: | | | |
| $53.50 | | | |

In an Action B several days later, the patron receives an additional $20 benefit, as shown in Table 22. In an Action C, the patron enters a rail system at a gate 28. The gate 28 adds $50.00 to the Amount Remaining field on the patron's smart card, and sends a force post (EUC4) to the central computer for an amount of $50.00. The central computer 12 recognizes the EUC4 as a credit card autoload request, and creates a claim for the $35.00 available on the benefits table using both Benefits 1 and 2. The central computer 12 forwards an EUC4 message for the difference of $15.00 to the credit card processing 22. The central computer 12 creates a confirmation row for $15.00 as shown in Table 23.

TABLE 22

Case 7 Updated Values After Action B

| Smart Card Data | Gate Autoload List | Fare Box Autoload List | Central Computer Benefits Table |
|---|---|---|---|
| P/P Code: 128 Amt: 50.00 Amt remaining: $2.50 | | | Benefit 1 Amt: $15.00 Benefit 2 Amt: $20.00 |

TABLE 23

Case 7 Updated Values After Action C

| Smart Card Data | Gate Autoload List | Fare Box Autoload List | Central Computer Benefits Table |
|---|---|---|---|
| P/P Code: 128 Amt: 50.00 Amt remaining: $52.50 | | | Benefit 1 Amt: $0 Benefit 2 Amt: $0 |

Although a preferred embodiment of the invention has been described above by way of example only, it will be understood by those skilled in the field that modifications may be made to the disclosed embodiment without departing from the scope of the invention, which is defined by the appended claims.

We claim:

1. A system for automatically loading a pre-determined value from a selectable source onto a patron's smart card, the system comprising:
    a central computer having a smart card data base for storing smart card data specific to the smart card;
    a means for initializing an autoload flag to "on" for automatic loading of the pre-determined value onto the smart card; and
    a gate device in communication with the central computer for automatically loading the smart card with the pre-determined value.

2. The system as in claim 1, wherein the selectable source is at least one benefit that is available to the patron through a transit customer, and wherein the central computer further comprises means for generating an autoload list containing a value of the at least one benefit and a control number for the at least one benefit and for downloading the autoload list to the gate device, the gate device further comprising means for comparing the control number of the at least one benefit to at least one control number on the smart card and automatically loading the smart card with the value if the control number of the autoload list does not match the at least one control number on the smart card.

3. The system as in claim 2, wherein the autoload flag is a benefit autoload flag contained in the smart card data base, and wherein the means for initializing the autoload flag to "on" is controlled by one of a transit authority, the patron, and the transit customer.

4. The system as in claim 2, wherein the at least one benefit is a plurality of benefits, each benefit of the plurality of benefits having an associated control number.

5. The system as in claim 1, wherein the selectable source is a credit card, and wherein the autoload flag is stored on the smart card, the gate device for loading the pre-determined value on the smart card if the autoload flag is "on" and for communicating a force post message to the central computer after the pre-determined value is loaded onto the smart card, wherein the central computer further comprises means for determining whether at least one benefit value is available in the smart card data base to offset the pre-determined value and for processing a credit transaction for a difference between the pre-determined value and the at least one benefit value.

6. The system as in claim 5, wherein the central computer further comprises a negative list for listing smart cards in which the credit transaction is denied, the negative list for prompting the gate device to set the autoload flag on the smart card to "off".

7. The system as in claim 5, wherein the means for initializing the smart card for automatic loading of the pre-determined value is a transit vending machine.

8. The system as in claim 7, wherein the transit vending machine utilizes at least one criterion to determine whether the patron is eligible for the automatic loading of the pre-determined value on the smart card.

9. The system as in claim 7, wherein the transit vending machine writes credit card information onto the smart card, and wherein the force post message to the central computer comprises the credit card information.

10. The system as in claim 1, wherein the gate device is one of a transit system rail gate and a transit system bus fare box.

11. A method for an automatic loading process for loading a benefits value onto a smart card, the method comprising:
    generating an autoload list comprising at least one benefit available for use with the smart card, a first value for the at least one benefit, and a first control number associated with the at least one benefit;
    initializing the smart card with a storage area for storing an amount remaining, a second value and a second control number;
    reading the second value and the second control number from the smart card to a transit gate;
    comparing the first control number to the second control number;
    if the first control number is different than the second control number,
        adding the first value for the at least one benefit to the amount remaining and updating the amount remaining on the smart card with the result;
        setting the second control number equal to the first control number;
        setting the second value equal to the first value; and
        updating the first value of the autoload list to zero if the second value is set equal to the first value; and
    if the first control number is the same as the second control number,
        terminating the automatic loading process.

12. The method of claim 11, wherein a central computer generates the autoload list, further comprising the step of downloading the autoload list to the transit gate.

13. The method of claim 11, wherein a partial value of the first value is added to the amount remaining, and wherein the first value of the autoload list is updated as the difference between the first value and the partial value.

14. The method of claim 11, further comprising the step of reading the amount remaining, and if the amount remaining is above a minimum level, then terminating the automatic loading process.

15. The method of claim 11, wherein the at least one benefit is a plurality of benefits having at least one control number and a plurality of first values associated with the at least one control number.

16. A method for an automatic loading process for loading a pre-selected credit card value onto a smart card, the method comprising:

initializing the smart card with a storage area for storing an amount remaining, credit card data, and an autoload flag; and reading the autoload flag;

if the autoload flag is "on", adding the pre-selected credit card value to the amount remaining on the smart card; and sending the credit card data and the pre-selected credit card value to a credit processing means, if the autoload flag is "off", terminating the automatic loading process.

17. The method of claim 16, wherein the credit processing means is a central computer, further comprising the steps of, determining whether patron benefits are available;

if the patron benefits are available, subtracting at least a portion of the patron benefits from the pre-selected credit card value;

initiating a credit process for requesting a credit transaction from a credit card processing company.

18. The method of claim 17, further comprising the step of receiving one of an approval or a denial from the credit card processing company; and if the denial is received, adding the smart card to a negative list, wherein the negative list is utilized to set the autoload flag to "off".

\* \* \* \* \*